DIAZO TYPE FILMS WITH EXTENDED LINEAR LATITUDE

Filed Jan. 16, 1967

*INVENTOR*
EARL M. EVLETH
CLIFFORD E. HERRICK, JR.

*BY* Edward W. Brown

ATTORNEY

United States Patent Office 3,484,241
Patented Dec. 16, 1969

3,484,241
DIAZO TYPE FILMS WITH EXTENDED LINEAR LATITUDE

Earl M. Evleth and Clifford E. Herrick, Jr., Los Gatos, Calif., assignors to International Business Machines Corporation, Armonk, N.Y., a corporation of New York Filed Jan. 16, 1967, Ser. No. 609,524
Int. Cl. G03c *1/58, 5/34*
U.S. Cl. 96—49 10 Claims

ABSTRACT OF THE DISCLOSURE

This application discloses an extended linear latitude diazo film having at least two stratified layers of which the layer closest to the printing light contains a diazo compound which has a significantly greater sensitivity to the printing light than the diazo compounds of the other layers lying further from the printing light. Its primary use is as a film element in a storage and retrieval system.

BACKGROUND OF THE INVENTION

Field of invention

The present invention relates to diazo type films which have extended linear latitude and, more particularly, diazo type films with such an extended linear latitude that they are highly suitable for use in image storage and retrieval systems.

Description of prior art

In a typical image storing and retrieval file system, an original document is copied onto a silver microfilm and transferred by contact printing to a diazo type film. The latter film becomes the file element and can take the form of a chip or film, a microfiche, or an aperture card. The output from the file element will be in the form of a duplicate of the file element and again will be a diazo type film. This duplicate will either be viewed directly or introduced into a hard copy machine to produce a paper copy of the original document of essentially its size and information density. Also, the duplicate will be used as a master to make further duplicates of the original.

In such a storage and retrieval system, it is of greatest importance that information fidelity be preserved. Thus, there must be an essentially linear relationship between the density of the original and the density of the file element and any duplicates of the file element. The usual microfilm record contains its density in formation within 0.8–1.2 density of input units. Consequently, a diazo type film with an extended linear latitude or a linear input density scale of at least about 0.8 is a bare minimum. In addition, since the file element is used as a master, to produce a duplicate of the file element, the transmission of the printing light through the file element or print speed is also highly important. This is because one of the primary objects of the image storage and retrieval system is low access time, which is dependent upon the time required to carry out each function of the system including making a duplicate of the file element.

Prior attempts at producing such a diazo type film have either resulted in the developed film having a two-tone effect or resulted in slowing the print speed when the file element is used as a master. First of these approaches incorporates two diazo compounds having slightly different exposure speed and special characteristics in a single layer. Such a film only exhibits approximately a 0.5 input density scale and, because of the two different diazo compounds are in the same layer, a two-tone effect results. Thus, this approach not only does not achieve the bare minimum input density scale of 0.8, but also produces a two-tone effect, which may be undesirable under certain circumstances.

The latter of these approaches produce a film with extended latitude above the bare minimum of 0.8 but, due to the ultraviolet light absorber, make the film undesirable as a file element in an image storage and retrieval system because the print speed of such a film is in excess of three times longer than the exposure required for a diazo film without the ultraviolet light absorber. Thus, these approaches increase the access time and, hence also are not suitable for use in an image storage and retrieval system.

SUMMARY OF THE INVENTION

It, therefore, is an object of the invention to provide improved diazo films exhibiting an extended linear input density scale of at least about 0.8 without increasing the print speed of the diazo film.

It is another object of the invention to provide a diazo film of such a configuration and formulation that diazo compounds having widely different light sensitivities can be utilized without two-toning resulting in the developed film.

In general, the foregoing objects are achieved by a novel diazo film having two or more stratified layers of which the layer closest to the printing light contains a diazo compound having a substantially greater sensitivity to the printing light than the diazo compounds of the other layers lying further from the printing light.

The advantages resulting from such diazo films are many. First, diazo compounds having a wide variation in sensitivity can be advantageously utilized in the film. Next, these films can exhibit an extended linear input density scale so that information in a silver halide film with a density spread as great as 1.2 density units can be printed without information loss. Further, the printing speeds of these films are comparable to those of a one diazo, single layer film. Finally, because the different diazo compounds are in separate layers, different coupling components for the diazo compound can be used to compensate for the two-toning effect.

Other and further objects and advantages of the invention will be apparent in the following more particular description of the preferred embodiments of the invention, as illustrated in the accompanying drawing, in which:

DESCRIPTION OF THE PREFERRED EMBODIMENTS

Light sensitivity can be evaluated in terms of speed index of a diazo compound which is dictated by the product $I_0K\phi$, $I_0$ being the monochromatic light intensity, K being the absorption constant or molar extinction coefficient of the diazo compound and $\phi$ being the quantum yield. Since $I_0$ relates only to monochromatic light, it is necessary to separately determine the product $I_0K\phi$ for each wave length over the spectral region of sensitivity of a diazo compound, which generally is somewhat between 3,000 A.–5,000 A., to determine the speed index of a diazo compound for polychromatic light. Thus, the speed index for a particular diazo exposed to actinic light of a particular spectral energy distribution is the sum of the monochromatic indices.

Figure 1:
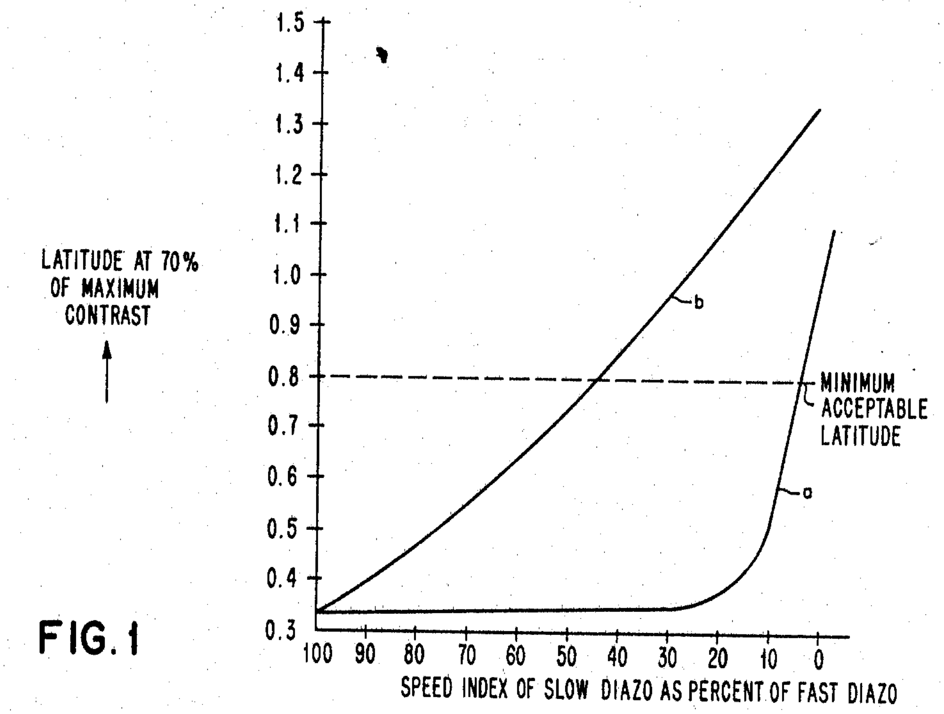
FIG. 1 is a correlation plot of speed index versus latitude.

Turning now to FIGURE 1, a plot of the relative speed index of the slow diazo (speed index of slow diazo over speed index of fast diazo) in the film versus the latitude at 70% of maximum contrast is shown, both for a single layer film (plot *a*) and for the layered films of the present invention (plot *b*). That is, FIGURE 1 shows how the speed index of the slow diazo must vary in order to produce increasing amounts of latitude which is measured by selecting those points on the sensitometric curve at which the sensitometric constant has fallen to 70% maximum contrast. These points fix two values of exposure and the difference between these two values is taken as the effective latitude. Setting 0.8 as the practical minimum of latitude, it can be seen from plot *a* that for a single layer of film, the slow diazo must have a speed index in the order of 10% of the fast diazo.

However, when the film is layered according to the present invention, the speed index of the slow diazo need only be about 40% of the fast diazo to achieve 0.8 latitude, as shown by plot *b*. Thus, one aspect of the present invention is that each underlying layer has a speed index of about 0.4 or less of its adjacent overlying layer. It will be apparent that one of the primary advantages in having a speed index differential of only a factor of four between the fast and slow diazo compounds rather than a factor of ten is the greater selection of diazo compounds available to formulate a film.

While it is to be understood that the present invention is not limited to $I_0$ of specific wavelengths, the following description for purposes of illustration is directed at diazo films which are to be used in an image information storage and retrieval system employing a high pressure mercury lamp as the printing light from which essentially all the light intensity is at wavelengths of 3650 A., 4050 A., and 4350 A.

As an example of how the relative speed indices can be determined when a high pressure mercury lamp is the light source, eight films were prepared and evaluated by the following general method. A solution of 1 g. citric acid, ½ g. sulfosalicyclic acid, ½ g. benzamide, 700 mg. of one of the diazo compounds listed in the following table, and 2 g. of 2-(n-propanol)-phenol coupler, in 50 ml. of a 50–50 mixture of methylethyl ketone and methanol. This solution was coated using a standard "reverse bead" coating applicator onto a supporting base of polyethylene terephthalate. Coated film was dried for one hour at 50° C. before evaluation. Small sections of these films were cut and measured on a sandard commercial sepctrophotometer, the optical densities at 3650 A., 4050 A., and 4350 A. being recorded. From this experimental work, the following table shows the relative $I_0K\phi$ for the three wave lengths and the summed $I_0K\phi$ at the three wave lengths of the eight films.

TABLE I.—RELATIVE SPEED INDICES (SI)

| Diazo Compound | Wavelength in A. 4,350 | 4,050 | 3,650 | Sum | Relative percent |
|---|---|---|---|---|---|
| I. 4-morpholino-2,5-diethoxybenzenediazonium chlorozincate | 31 | 60 | 46 | 137 | 100 |
| II. 4-morpholinobenzenediazonium fluoborate | 1 | 26 | 73 | 100 | 73 |
| III. 4-benzamido-2,5-diethoxybenzenediazonium fluoborate | 6 | 14 | 20 | 40 | 29 |
| IV. 4-phenoxy-2,5-diethoxybenzenediazonium fluoborate | 3 | 11 | 19 | 33 | 24 |
| V. 2,5-diethoxy-4-(p-tolymercapto)benzenediazonium chlorozincate | 20 | 24 | 33 | 77 | 56 |
| VI. 4-acetamido-2,5-diethoxybenzenediazonium chlorozincate | 3 | 13 | 21 | 37 | 28 |
| VII. p-Diethylaminobenzenediazonium fluoborate | 0 | 21 | 90 | 111 | 87 |
| VIII. 2,5-diethoxy-4-(4'-ethoxyphenyl)benzenediazonium fluoborate | 28 | 10 | 18 | 56 | 41 |

By using 4-morpholino-2,5-diethoxybenzenediazonium chlorozincate as the fast diazo compound reference, it can be seen that diazo compounds III, IV, and VI are less than 40% the speed of this fast diazo and diazo compound VIII is about 40% and, hence, are usable as the slow diazo. It is also seen that diazo compound VII can be used as the fast diazo with compounds III, IV and VI.

In general, the shape of the spectral absorption curve for diazo material does not vary greatly from diazo compound to diazo compound, although the position of the absorption maxima and its height is structure sensitive. Further, the quantum efficiency does not vary greatly with wave length. For these reasons if the position of the absorption maxima is fixed, the speed index varies more or less linearly with the molar extinction coefficient measured at its maxima. Thus, it is possible to provide guidelines for the selection of suitable slow diazos according to the amount of extended latitude desired.

Figure 2:
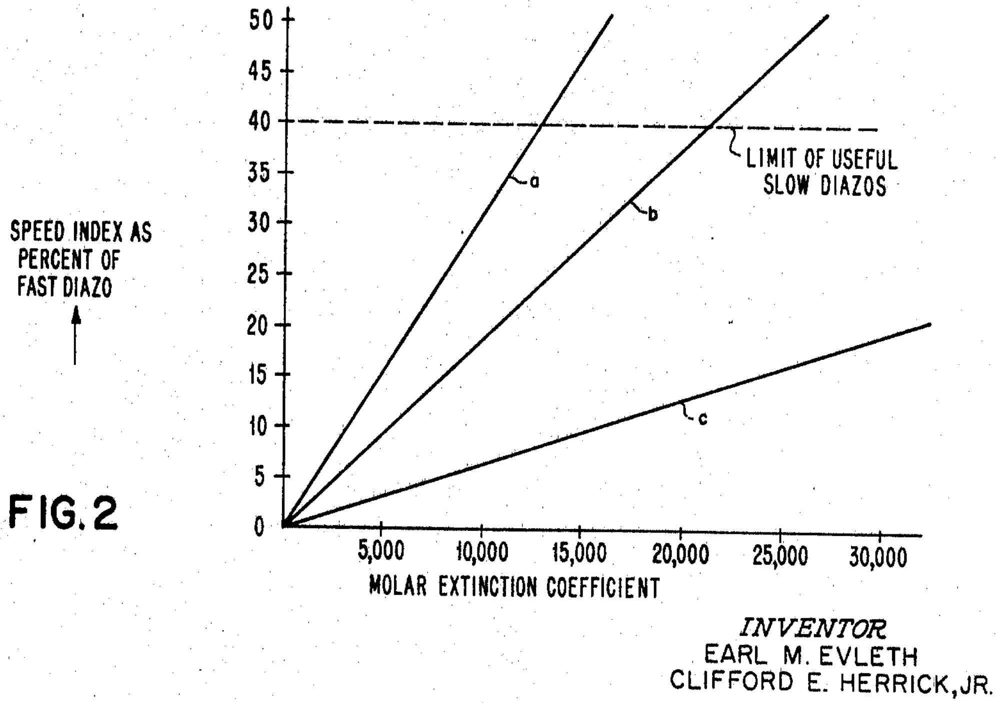
FIG. 2 is a correlation plot of molar extinction coefficient versus the relative speed index of the slow diazo.

FIGURE 2 provides such guidelines and represents a correlation plot of the molar extinction coefficient versus the relative speed index of the slow diazo $$\left(\frac{\text{speed index of slow diazo}}{\text{speed index of fast diazo}}\right)$$

in the layered film of the present invention. This correlation plot is based on a spectral energy distribution characteristic of a typical high pressure mercury arc. The very fast diazo compound, 4-morpholino-2,5-diethoxybenzenediazonium chlorozincate having a molar extinction coefficient of 26,000 at 4050 A. was taken as the reference fast diazo compound and assigned a speed index of 100%. It was assumed that the absorption band of the slow diazo compound to be of normal shape, e.g., with a bandwidth of one-half its maximum extinction coefficient of 4000–5000 centimeter$^{-1}$ and a constant quantum yield of about 0.4.

The correlation plot of FIGURE 2 shows that diazo compounds can be divided into several general groups, those compounds having maximum absorption in the 3800–4100 A. region yielding linear plot *a*, those diazos having absorption maxima either at 3500 A. and 4500 A. yielding linear plot *b*, and those diazos having absorption maxima at 3300 A. yielding linear polt *c*. Diazo compounds having absorption maxima in the 3500–3800 A. region and the 4100–4500 A. region lie between plots *a* and *b*. Diazos having absorption maxima between 3300–3500 A. lie between plots *b* and *c*. The reason for the no change in the speed index-molar extinction coefficient relationship between 3800–4100 A. is that as the position of the absorption maxima shifts, losses at the 3650 A. is compensated for by an increase in absorption at the 4150 A. actinic line.

As an example in how FIGURE 2 can be used as a guideline in selecting the slow diazo, it will be seen that if the slow diazo has an absorption maxima of about 3500 A. (plot *b*), it should have a molar extinction coefficient below about 22,000 to be useful as the slow diazo in the layered film of the present invention having an extended latitude of 0.8 or above.

While the correlation plot of FIGURE 2 is based on a reference fast diazo of 4-morpholino-2,5-diethoxybenzenediazonium chlorozincate and diazo compounds of equivalent speed, if a diazo compound, faster than this reference compound, is employed as the fast diazo, angle $\theta$ will increase and now diazo compounds with higher extinction coefficients may be used as the slow diazo. Conversely, if the reference fast diazo is slower than 4-morpholino-2,5-diethoxybenzenediazonium chlorozincate, then angle $\theta$ will be smaller, and diazo compounds with lower extinction coefficients should be used as a slow diazo component.

Preferably, the slow diazo compound normally is selected from the diazo compounds lying along plots *a* and *b* and in the region between plots *a* and *b* because these compounds are easier to synthesize and have dye colors which more closely match the dye colors of the fast diazos.

In general, when a high pressure mercury arc ultraviolet light source is employed, the slow diazo compound will preferably be a diazo compound selected from the group consisting of:

(I) a compound having the following structural formula:

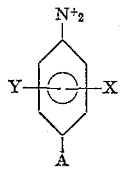

wherein X and Y may the same or not the same and selected from the group consisting of hydrogen, alkoxy, aryl and halogen, and wherein A is selected from the group consisting of (1) hydrogen, (2) alkyl, (3) alkoxy, (4) aryloxy, (5) a radical having the formula:

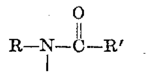

wherein R and R′ may be the same or not the same and are selected from the group consisting of hydrogen, alkyl, hydroxyalkyl, substituted aryl, arylalkyl, and substituted arylalkyl; and (6) a radical having the formula:

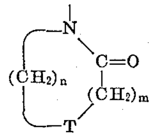

wherein T is selected from the group consisting of O, N, $CH_2$, and S, and wherein *m* and *n* are integer numbers from 1 to 4 and may be the same or not the same;

(II) a compound with a cation having the following structural formula:

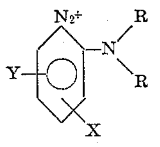

wherein X and Y may be the same or not the same and are selected from the group consisting of alkyl and halogen, and wherein R is alkyl.

Examples of compounds falling within the above general formula are: 1-diazo-4-nitrobenzene, 1-diazo-3-methoxybenzene, diazobenzene, 1-diazo-4-methoxybenzene, 1-diazo-3,4,5-trimethoxybenzene, 1-diazo-2,3,5-trimethoxybenzene 1-diazo-2,5-dimethoxybenzene, 1-diazo-2 - methoxybenzene, 1-diazo-3,4-dimethoxybenzene, 1-diazo-2,4,5-trimethoxybenzene, 1-diazo-2,4-dimethoxybenzene, 1-diazo-2,6-dimethoxybenzene, 1-diazo - 2,4,6 - trimethoxybenzene, 1-diazo-4,5-dimethyl-2-dimethylaminobenzene, 1-diazo-2,5-diethoxybenzoylaminobenzene, 1-diazo-2,5-dibutoxybenzoylaminobenzene, and N-(4-amino-2,5-dibutoxyphenyl)ethylcarbamate.

While the particular diazo compounds utilized as the fast diazos will vary depending upon the light source, as was pointed out to be the case with the slow diazo, most of the preferred fast diazos when a high pressure mercury arc ultraviolet light source is employed will have the structural formula:

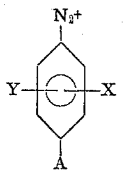

wherein X and Y are the same or not the same and selected from the group consisting of alkoxy, halogen, carboxy, alkyl, hydrogen, and wherein A is selected from the group consisting of a radical having the formula:

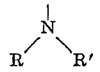

wherein R and R′ are the same or not the same, and selected from the group consisting of hydrogen, alkyl, alkoxy, aryl, hydroxyalkyl, alkylaryl, and alkyl substituted aryl, and (2) a radical having the formula:

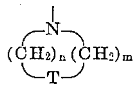

wherein T is selected from the group consisting of O, N, $CH_2$, and S, and wherein *m* and *n* are integer numbers from 1 to 4 and may be same or not the same.

Examples of compounds falling within the above general formula are:

1-diazo-4-dimethylaminobenzene,
1-diazo-4-diethylaminobenzene,
1-diazo-4-diethoxyaminobenzene,
1-diazo-4-dihydroxypropylaminobenzene,
1-diazo-4-methylallylaminobenzene,
1-diazo-4-dibutylaminobenzene,
1-diazo-4-diamylaminobenzene,
p-oxolidinoaniline,
N,N′-bis(4-aminophenyl)dimethylene-diamine,
N,N′-bis(4-aminophenyl)piperazine,
N,N′-bis(4-aminophenyl)bis-trimethylenediamine,
1-diazo-4-cyclohexylaminobenzene,
9-(p-diazophenyl)carbazole,
1-diazo-4-(di-hydroxyethyl)amino-3-methylbenzene,
1-diazo-3-methyl-4-monoethylaminobenzene,
1-diazo-3-methyl-4-dimethylaminobenzene,
1-diazo-2-methyl-4-(N-methyl-N-hydroxypropyl-aminobenzene,
1-diazo-4-dimethylamino-3-ethoxybenzene,
1-diazo-3-methoxy-4-(N-n-propyl-N-cyclohexyl)amino-benzene,
1-diazo-2-carboxy-4-dimethylaminobenzene,
1-diazo-4-diethylamino-3-chlorobenzene,
1-diazo-4-diethylamino-3-bromobenzene,
1-diazo-2-carboxy-4-diethylaminobenzene,
1-diazo-2-ethoxy-4-diethylaminobenzene,
1-diazo-4-methylamino-3-ethoxy-6-chlorobenzene,
1-diazo-2,5-dichloro-4-(N-methyl-N-cyclohexyl)-aminobenzene,
1-diazo-2,5-dichloro-4-benzylaminobenzene,
1-diazo-4-ethylbenzylaminobenzene,
1-diazo-4-methylbenzylamino-3-ethoxybenzene,
1-diazo-4-oxyethylbenzyl-3,6-diethoxyaminobenzene, 1-diazo-4-methylbenzylamino-2,5-diethoxybenzene,
1-diazo-4-ethylbenzyl-3-ethoxyaminobenzene,
4-diazo-4′-ethoxydiphenylamine,
1-diazo-3-morpholinoaminobenzene,
1-diazo-4-morpholino-3-methoxyaminobenzene,
1-diazo-4-morpholino-2,5-dimethoxyaminobenzene,
1-diazo-4-morpholino-2,5-diethoxyaminobenzene,
1-diazo-4-morpholino-2-ethoxy-5-methoxyamino-benzene,
1-diazo-4-morpholino-2,5-dipropoxyaminobenzene,
1-diazo-4-morpholino-2,5-dibutoxyaminobenzene and
1-diazo-4-thiomorpholino-3-ethoxybenzene.

Both the slow and fast diazo compounds preferably are employed in the form of their double salt complexes with zinc chloride, cadmium chloride, tin chloride, boron trifluoride or in the form of its sulphate.

The coupling components which are used in the layered diazo film of the present invention are the type generally employed in the manufacture of light sensitive diazo layers. These couplers may be those containing a phenolic hydroxy group or an active methylene group. Examples of such compounds are: urea of m-aminophenol, 2,5-diethoxyphenol, 2,5-dimethoxyphenol, 1,3 - dihydroxybenzene, 1,3 - dihydroxy - 4-chlorobenzene, N-β-hydroxyethyl-α-resorcylamide, α-resorcylamide, N-phenyl-α-resorcylamide, resorcinol monoacetate, diethylamidomonoethyl resorcinol ether, 1,3,5-resorcylic acid ethanolamide, 1,2,5-resorcylic acid ethanolamide, m,m′-trimethylene dioxydiphenol, m,m′-1-methyltrimethylene dioxydiphenol, 6,6′-dimethyl-3,3′-trimethylene dioxydiphenol, m,m′-(p-phenylenedimethylenedioxy) - diphenol, 6,6′-dihexyl-3,3′-isopropylidene dioxydiphenol, bis - (2,4-dihydroxyphenyl sulfide), 2,2′,4,4′ - tetrahydroxydiphenyl, 1 - hydroxy-3-sulfanylnaphthalene, 3-hydroxy-2-naphthoic acid ethanolamide, 3-hydroxy-2-naphthoic acid diethanolamide, 2,3-dihydroxynaphthalene, 2,7-dihydroxynaphthalene, 1,5-dihydroxynaphthalene, 5,5 - dimethyl-1,3-cyclohexanedione, 5 - methyl-5-ethyl-1,3-cyclohexanedione, acetoacetanilide, 1-phenyl-3-methyl-5-pyrazolone, 7-hydroxynaphtho-1′,2′,4,5-imidazole, 2,5-dimethyl-4-morpholinomethylphenol, 2-methyl - 5-isopropyl-4-morpholinomethylphenol, 3-methyl-6 - isopropyl-4-morpholinomethylphenol, and 3-methyl-6-ethyl-4-morpholinomethylphenol.

The sensitizing composition, in addition to the diazonium compound and the azo coupling component, also contains the usual adjuncts designed to effect stabilization, such as thiosinamine, benzamide, and the like, and the usual adjuncts designed to retard the precoupling, such as citric acid, sulfosalicylic acid, boric acid, tartaric acid and the like.

The components, prior to coating, are dissolved in suitable solvents such as water, isopropyl alcohol, butyl alcohol, acetone, methanol, methoxymethanol, 2-methoxyethyl acetate and the like.

The carrier or base layer may be a polyester, such as polyethylene terephthalate, a vinyl base, such as polyvinyl acetate, polystyrene, and cellulose triacetate. The coating techniques employed may be what is known as reverse bead or the methods described in U.S. Patents 2,799,609 and 3,009,847.

The invention is further illustrated by the following examples, but it is to be understood that the invention is not to be restricted thereto.

EXAMPLE I

A 50 ml. solution of methylethyl ketone (50 parts) and methanol (50 parts) was prepared. Into this solution was dissolved:

1 g. citric acid
0.5 g. sulfosalicylic acid
0.5 g. benzamide
350 mg. 2-(n-propanol)-phenol
150 mg. 4-morpholino-2,5-diethoxybenzenediazonium zinc chloride double salt This solution was applied onto 3 mil subbed polyethylene terephthalate base using the reversed bead technique, which comprises a coating tray and a pickup roller for depositing the coating solution onto the base as it passes by on another roller. An identical solution, as described above, was prepared with the exception that the diazo component was 150 mg. of 4-benzamido-2,5-diethoxybenzenediazonium fluoborate. This solution was coated by the reverse bead technique onto the subbed uncoated side of polyethylene terephthalate film. The coated film was dried for one hour at 50° C. One portion of the prepared film was exposed using, as the original, a Kodak step tablet, commonly referred to as a step wedge and, as the light source, a high pressure mercury arc. The layer containing the 4 - morpholino - 2,5 - diethoxybenzenediazonium zinc chloride double salt was closest to the light source. After exposure, film was developed under 90 pounds pressure of ammonia gas for one second, as described in Ser. No. 369,861, filed May 25, 1964 now Patent No. 3,411,-906. The developed film then was examined step by step for density on a MacBeth Ansco densitometer using a 7–51 filter. A sensitometric or H and D curve was plotted and showed an extended latitude of 1.0 density units and a gamma slightly less than 0.95 for the layered film.

To show that the coating with the fast diazo compound must be nearest to the light source, another portion of the prepared film was exposed through the step wedge with the coating containing the 4-benzamido-2,5-diethoxybenzenediazonium fluoborate (i.e., the slow diazo) closest to the mercury arc light source. After exposure, development with 90 pounds pressure of ammonia gas, the film was examined under the densitometer and the H and D curve plotted. The curve showed extended latitude of 0.6 density units and a gamma of 1.3.

EXAMPLE II

A solution was prepared having 25 ml. of a 10% solution of polyvinylbutyral and 5 ml. of ethanol. Into this solution was dissolved:

1 g. citric acid
½ g. sulfosalicylic acid
½ g. benzamide
328 mg. of 2-(n-propanol) phenol
100 mg. of 2-ethoxy - 4 - diethylaminobenzenediazonium fluorborate This solution was coated onto a 3 mil subbed polyethylene terephalate base using a doctor blade with a 5 mil wet gap. An identical solution, as described above, was prepared with the exception that the diazo compound was 100 mg. of 2,5-dimethoxybenzenediazonium fluoborate and the amount of the coupler was increased to 370 mg. This second solution was coated on a separate 3 mil subbed polyethylene terephthalate base again using a doctor blade with a 5 mil wet gap. After coated films were dried for one hour at 50° C., the coated sides of the film were brought into face-to-face contact. Using the step wedge of Example I as the original and the high pressure mercury arc as the light source, the films were exposed while the coatings were in face-to-face contact and with the coating containing the 2-ethoxy-4-diethylaminobenzenediazonium fluoborate closest to the light source. After being developed under 90 pounds pressure of ammonia gas as in Example I, the developed film composite was examined on the densitometer and the readings plotted to form an H and D curve. The curve showed an extended latitude of 1.04 density units and a gamma of 1.0.

EXAMPLES III–IX

Using the coating technique of Example II, 300 mg. of 2-(n-propanol)-phenol, the same solvents and additives, and 100 mg. of the diazonium compounds, the following film composites were prepared, examined on the densitometer, and H and D curves plotted:

| Fast Diazo | Slow Diazo | Extended Latitude (density units) | Gamma |
|---|---|---|---|
| III. 4-morpholino-2,5-diethoxybenzenediazonium chlorozincate. | 4-phenoxy-2,5-diethoxybenzenediazonium fluoborate.* | 1.1 | 0.96 |
| IV. Same as Ex. III | 2,5-dimethoxy benzenediazonium fluoborate. | 1.25 | 0.98 |
| V. Same as Ex. III | 4-acetamido-2,5-diethoxybenzene-diazonium chlorozincate. | 1.0 | 0.95 |
| VI. Same as Ex. III | 2,5-diethoxy-4-(4'-ethoxyphenyl)-benzenediazonium fluoborate. | 0.8 | 0.9 |
| VII. p-Diethylamino benzenediazonium fluoborate. | 4-benzamido-2,5-diethoxybenzenediazonium fluoborate. | 0.9 | 0.92 |
| VIII. Same as Ex. VII | 4-phenoxy-2,5-diethoxybenzene-azonium fluoborate. | 1.0 | 0.95 |
| IX. Same as Ex. VII | 4-acetamido-2,5-diethoxybenzenediazonium chlorozincate. | 0.9 | 0.92 |

* This compound was prepared by treating 2,5-diethoxy-4-chloronitro benzene with phenol using a copper catalyst. This resulted in a 40% yield of 2,5-diethoxy-4-phenoxynitrobenzene (M.P. 54–5° C.), after recrystallization from petroleum ether. Reduction of the above compound to 2,5-diethoxy-4-phenoxyaniline (78% yield, M.P. 57–9° C.) was accomplished using a palladium catalyst and hydrogen. This compound was diazotized by standard procedure at 5° C. and, after treatment with 48% fluoboric acid, a yellow solid was isolated. This solid compound was recrystallized from ethanol to yield 4-phenoxy-2,5-diethoxybenzenediazonium fluoborate having a melting point (M.P.) of 148° C. with decomposition. The following is the chemical analysis of this compound:

| | C | H | N |
|---|---|---|---|
| Calculated | 51.36 | 5.12 | 7.48 |
| Found | 51.46 | 4.66 | 7.75 |

The other compounds and azo couplers are known in the literature.

EXAMPLE X (COMPARISON)

For comparison purposes, a layered diazo film was prepared in which one layer contained a slow diazo compound which was 56% as fast as the fast diazo compound in the other layer. That is, the speed index of the slow diazo compound was 0.56 of the fast diazo compound. Specifically, a solution was prepared of 25 ml. of 10% cellulose acetate butyrate and 5 ml. of methanol. To this solution was added the following:

1 g. citric acid
0.5 g. sulfosalicylic acid
0.5 g. benzamide
300 mg. 3-phenyl-3-(2-hydroxy - 4 - methylphenyl)-propanol
100 mg. 2,5-diethoxy-4-(p-tolylmercapto)-benzenediazonium zinc chloride double salt This solution was coated onto a 3 mil subbed polyethylene terephthalate base using a doctor blade with a 5 mil wet gap. An identical solution, as described above, was prepared with the exception that the diazo compound was 100 mg. of 4-morpholino-2,5-diethoxybenzenediazonium zinc chloride double salt. The second solution was coated on a separate 3 mil subbed polyethylene terephthalate base again using a doctor blade with a 5 mil wet gap. After the films were dried for one hour at 50° C., the coated sides of the films were brought into face-to-face contact. Using the step wedge of Example I as the original and the high pressure mercury arc as the light source, the films were exposed while the coatings were in face-to-face contact and with the coating containing the 4-morpholino-2,5-diethoxybenzenediazonium zinc chloride double salt nearest to the light source. After being developed under 90 pounds pressure of ammonia gas as in Example I, the developed film composite was examined on the densitometer and the readings plotted to form an H and D curve. The curve showed an extended latitude of only 0.64 density units and a gamma of 0.85.

While the invention has been particularly shown and described with reference to preferred embodiments thereof, it will be understood by those skilled in the art that variations in form may be made therein without departing from the spirit and scope of the invention.

What is claimed is:

1. A diazotype light sensitive material comprising a substantially transparent base and at least two stratified light-sensitive layers thereon, each containing a light-sensitive diazo compound and an azo coupling component, said sensitive layers being positioned during exposure so as to be acted on in sequence by the printing light having a wavelength of from 3000 to 5000 A., the speed index of the diazo compound in the first stratified layer to be acted on by the printing light being a predetermined value, the diazo compound in stratified layer next adjacent said first stratified layer and next to be acted on by the printing light having a speed index of about 0.4 or less of said predetermined value.

2. The diazotype light-sensitive material of claim 1 wherein the printing light to be used is a mercury arc and wherein the diazo compound in said next adjacent layer has an absorption maxima in the region of 3500–4500 A. and a molar extinction coefficient of less than about 22,000.

3. The diazotype light-sensitive material of claim 1 wherein the printing light to be used is a mercury arc and wherein the diazo compound in said next adjacent layer has an absorption maxima in the region of 3800–4100 A. and a molar extinction coefficient of not greater than about 13,000.

4. The diazotype light-sensitive material of claim 1 wherein the printing light to be used is a mercury arc and wherein the diazo compound in said first stratified layer is a salt of 1-diazo-4-morpholino-2,5-diethoxybenzene and the diazo compound in said next adjacent layer is a salt of 1-diazo-4-benzamido-2,5-diethoxybenzene.

5. The diazotype light-sensitive material of claim 1 wherein the diazo compound in said next adjacent layer has a speed index of 0.3 or less of the speed index of the diazo compound in the first stratified layer.

6. The diazotype light-sensitive material of claim 1 wherein the diazo compound in said next adjacent layer has a speed index of 0.25 or less of the speed index of the diazo compound in the first stratified layer.

7. A method of reproducing continuous tone images on light-sensitive diazotype material comprising:

exposing a light-sensitive material comprising a substantially transparent base and at least two stratified light-senstive layers thereon, each containing a light-sensitive diazo compound and an azo coupling component, to a light source having a wavelength of from 3000 to 5000 A. through a continuous tone image, the diazo compound in the layer closest to the light source having a speed index of a predetermined value, the diazo compound in the next adjacent layer to said closest layer having a speed index of about 0.4 of less of said predetermined value, developing the exposed areas of said diazotype material whereby the sensitometric characteristics are such that at least a spread of 0.8 density units of the continuous tone image have been linearly reproduced.

8. The method of claim 7 wherein the diazo compound in said next adjacent layer has a speed index of 0.25 or less of the speed index of the diazo compound in the first stratified layer.

9. The method of claim 7 wherein the diazo compound in said next adjacent layer has a speed index of 0.25 or less of the sped index of the diazo compound in the first stratified layer.

10. The method of claim 7 wherin the developing step is carried with high pressure ammonia gas.

References Cited

UNITED STATES PATENTS

| | | | |
|---|---|---|---|
| 2,501,874 | 3/1950 | Peterson | 96—75 XR |
| 2,793,118 | 5/1957 | Sanders et al. | 96—91 |
| 3,069,268 | 12/1962 | Herrick | 96—75 XR |
| 3,103,436 | 9/1963 | Fago | 96—30 |
| 3,353,984 | 11/1967 | Landau | 96—91 XR |
| 3,370,949 | 2/1968 | Van Groenland | 96—75 |

OTHER REFERENCES

Alfaya, R.: "Phot. Sci. Eng.," vol. 6, pp. 258–264, September 1962.

"Camera," vol. 43, No. 12, pp. 46–47, December 1964.

NORMAN G. TORCHIN, Primary Examiner

C. BOWERS, Assistant Examiner

U.S. Cl. X.R.

96—75, 91